United States Patent [19]

Takeuchi et al.

[11] Patent Number: 4,577,319

[45] Date of Patent: Mar. 18, 1986

[54] ERROR FLAG PROCESSOR

[75] Inventors: Takashi Takeuchi, Fujisawa; Keizo Nishimura, Yokohama; Masaharu Kobayashi, Yokohama; Kazumasa Oiso, Yokohama, all of Japan

[73] Assignee: Hitachi, Ltd., Tokyo, Japan

[21] Appl. No.: 730,258

[22] Filed: May 6, 1985

Related U.S. Application Data

[63] Continuation of Ser. No. 422,299, Sep. 23, 1982, abandoned.

[30] Foreign Application Priority Data

Sep. 30, 1981 [JP] Japan .................................. 56-153702
Sep. 30, 1981 [JP] Japan .................................. 56-153704
Sep. 30, 1981 [JP] Japan .................................. 56-153706

[51] Int. Cl.[4] ...................... G06F 11/10; G11B 27/00
[52] U.S. Cl. .................................................... 371/38
[58] Field of Search ...................... 371/37, 38, 39, 40; 360/38.1, 53

[56] References Cited

U.S. PATENT DOCUMENTS

4,281,355 7/1981 Wada et al. ............................ 371/38
4,292,684 9/1981 Kelly et al. ............................ 371/38
4,375,100 2/1983 Tsuji et al. ............................ 371/38

Primary Examiner—Charles E. Atkinson
Attorney, Agent, or Firm—Antonelli, Terry & Wands

[57] ABSTRACT

An error flag processor for digital signals includes a memory having an information word frame comprised of signal words and correction words, an error detector for detecting errors in an input signal in units of one frame, a write address circuit for writing into an error flag RAM one error flag for one frame upon detection of an error in the words of the frame, an error correcting circuit for correcting data subjected to de-interleave and a read out of the memory, and read address circuit for reading error flags in units of one frame corresponding to individual words from the memory to the error correcting circuit, whereby the storage requirements for the error flags can be reduced. When old storage regions for correction words in the information word frame memory are used as error flag regions and the error flags are arranged in accordance with the signal word frames, the error flag RAM can be omitted.

14 Claims, 14 Drawing Figures

ERROR FLAG PROCESSOR

This application is a continuation of application Ser. No. 422,299, filed Sept. 23, 1982, and now abandoned.

This invention relates to an error flag processor in a digital signal processing system, particularly a PCM audio system and a digital audio disc (DAD) system.

Conventionally, an example of an error flag processing has been found in a PCM audio recording and reproduction utilizing a video tape pursuant to the Standards of the Electronic Industries Association of Japan (EIAJ). In the PCM reproduction, the signal is quantized with 14 bits and unoccupied bits are available when information is stored in a RAM of a construction to meet 8-bits or 4-bits per word in the EIAJ standard for digital signal processing. Therefore, no inconvenience arises from the addition of a flag as a result of error detection to each data and storage of the data and flag into the RAM.

However, in a system such as a digital audio disc player in which the signal is quantized with 8 bits or 16 bits in an attempt to improve the quality of the sound, no unoccupied bits are available even if the RAM of 8-bit or 4-bit construction is used and a RAM dedicated to error flags is necessary. Accordingly, the advent of a novel error flag processor capable of saving the storage capacity of the error flag RAM as much as possible has been desired. At the same time, the desirability has been directed to development of a system which can control reading and writing of addresses for the error flag RAM using as simple a device as possible.

Figure 1:
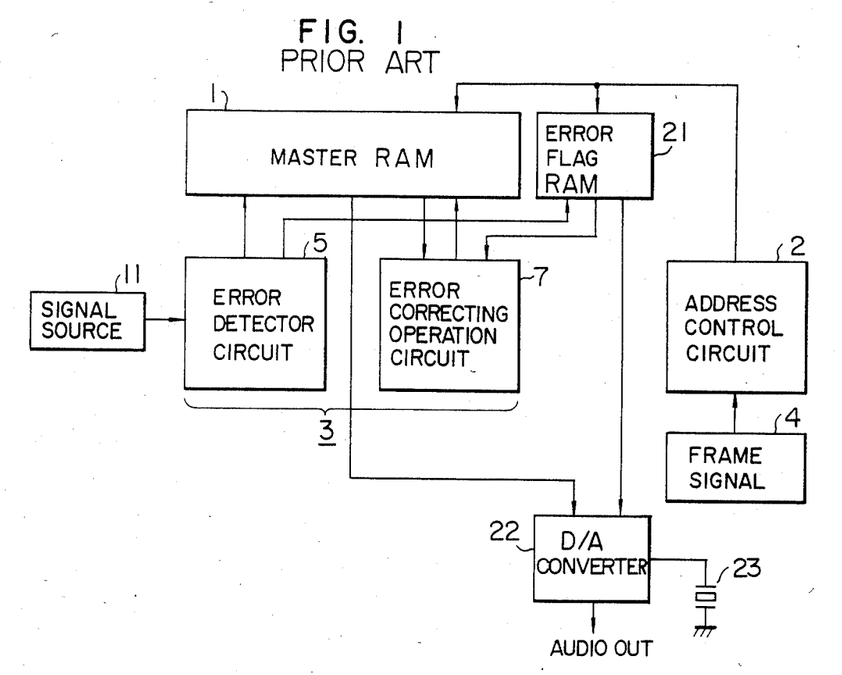
FIG. 1 is a block diagram showing a prior art error flag processor.

A conventional PCM decoder, partially shown in block form in FIG. 1, comprises a reproduced signal source 11 in the form of a PCM audio disc player, a master RAM 1 for signal words, a RAM address control circuit 2 for generating an address control signal in accordance with a frame signal source 4, a digital signal arithmetic operation circuit 3 including an error detector circuit 5 and an error correcting operation circuit 7, an error flag RAM 21, a digital-to-analog (D/A) converter circuit 22 reproducing an audio signal, and a quartz generator 23 with a resonator for generating a reference signal (clock). In the digital signal arithmetic operation circuit 3, it is determined by the error detector circuit 5 whether reproduced signal words from the signal source 11 are correct or not, and error signal words are usually corrected by the error correcting operation circuit 7.

Signal words, which have failed to be corrected are each assigned with an error flag of one bit and the error flag is stored in the error flag RAM 21.

While the D/A converter circuit 22 on the output side operates on the basis of the reference provided by an oscillation signal from the reference generator 23, the digital processing circuit, such as a data separation circuit and digital signal arithmetic operation circuit 3, operates on the basis of a reference from the address control circuit 2 comparable to a jitter on the reproduction side. Accordingly, the D/A converter circuit 22 is coupled through the RAM 1 with the digital processing circuit and is asynchronous therewith. The RAM 1 is also adapted for processing, such as for a de-interleave operation and is required to have a capacity of about 2K×8 bits, and the RAM 21 dedicated to the error flags is likewise required to have a capacity of 2K×1 bits.

The D/A converter circuit 22 reads the error flag allotted to the signal word from the error flag RAM 21 to determine whether the signal word is to be directly outputted or whether signal concealment, such as linear interpolation and previous word hold, is to be effected.

In the example of FIG. 1, since the RAM 21 is of four-bit construction, the signal word is of 4 bits×4 (upper bits plus lower bits equals 16 bits of an audio signal), and the error bit is 4 bits×1. If a 4-bit RAM for general purpose is used, then the error flag RAM 21 has three unoccupied bits which are of no use.

An object of this invention is to provide an error flag processor intended for saving the storage capacity of a RAM and making effective use of the RAM in digital signal processing.

Another object of this invention is to provide a RAM control device capable of simplifying controlling of write addresses for writing error flags into a RAM in units of one frame when the interleave distance between adjacent data has a specified value and capable of controlling of read addresses corresponding to individual symbols to be read when an error correcting operation is carried out.

To accomplish the above objects, according to one aspect of the present invention, there is provided an error flag processor wherein error detection of an input signal is effected in units of one frame and error flags are written into an error flag RAM by one error flag per unit of one frame, and when an error correcting operation is then effected for data subjected to deinterleave in and read out of a master RAM, error flags corresponding to individual symbols in units of one frame are read out of the error flag RAM. The processor can save the storage capacity of the error flag RAM to a great extent. A device in the form of a simple circuit including three counters or two counters, a ROM and an adder in combination is adapted for controlling the read and write addresses for the error flag RAM.

In the case where the number of data within one frame is n, the interleave between adjacent data has a fixed distance D which is equal to the second, third, ... power to 2 (2, 4, 8, 16...) times frame, and the capacity of the error flag RAM is mD (m≧n), while the write address for writing error flags as a result of error detection into the error flag RAM in units of one frame is counted up by one count, the read address for reading the error flags in the error correction system is started from a write address of (n=1)×D and counted up by D counts. Accordingly, for controlling the write address, a first counter is required which is counted up by one count for each frame, and for controlling the read address, a second counter is required which is started from the count of (n−1)×D and counted up by D counts. However, when the interleave distance D assumes the second, third, ... power of 2 times frame, the addition in the second counter can be performed by counting up upper counts of the second counter alone; and the initial value for reading can be obtained by counting up the first or the address counter for writing by (m−n+1)×D counts, and this initial value can be added with D counts, (n−1) times, to coincide with the write address. Accordingly, a further simplified device for controlling the read and write addresses for the error flag RAM can be constituted by a single counter and a circuit which switches the clock to an upper section of the single counter.

The capacity of the flag RAM for error correction and concealment can be reduced in accordance with the invention.

To this end, according to another aspect of this invention, in an error correcting processing performed in units of one frame, storage regions for old correction words are used as error flag regions, error data is written into the error flag regions, and error flags are so arranged as to correspond to frames of signal words so that when the error flags are read to a D/A converter, they are made correspond to error data distributed to the respective signal words. This arrangement of error flags facilitates addition of flags representative of an error correcting operation state and a peak level.

The embodiments of the present invention will be apparent from the following detailed description taken in conjunction with the accompanying drawings, in which.

The present invention will be applied to a PCM audio disc reproducing system as will be described below.

Figure 2:
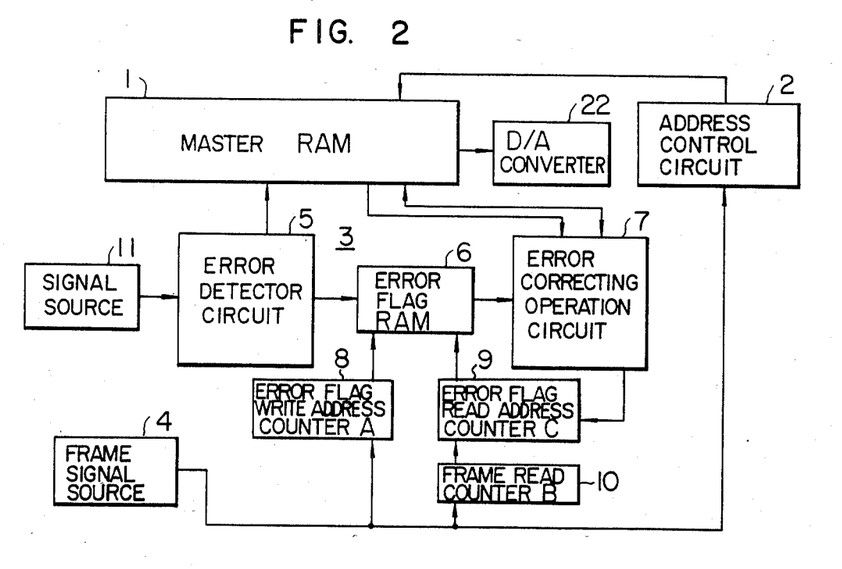
FIG. 2 shows in block form a first embodiment of an error flag processor according to the invention.

A first embodiment of an error flag processor in such an application will first be described with reference to FIG. 2, in which the reference signal generator 23 is omitted for simplicity of illustration. An error flag write address counter A 8 and a frame read counter B 10 are counters which are incremented by one count in response to a frame signal from a frame signal source 4 each time a frame occurs. An error flag read address counter C 9 assumes the count of the counter B 10 as an initial value each time the frame occurs and is counted up by four counts, which four counts correspond to an interleave distance between adjacent symbols, in order to search for error flags associated with symbols $W_1$, $W_2$, . . . An error flag RAM 6 is adapted to store flags as a result of the error detection with respect to input data in units of one frame, and a master RAM 1 is adapted to store audio data and at least Q parities for de-interleave and jitter absorption. An error detector circuit 5 detects errors in the input data which is released from scrambling and produces error flags as a result of the detection, and an error correcting arithmetic operation circuit 7 receives from the RAM 1 information regarding the error flags and corrects 28 symbols $W_1$, $W_2$, . . . , $Q_0$ . . . , $Q_3$, . . . , $W_{24}$ which are subjected to a de-interleave operation and read out. Denoted by reference numerals 2, 11 and 22 are an address control circuit, a signal source and a D/A converter. The error detector circuit 5 and error correcting arithmetic operation circuit 7 constitute a digital signal operation circuit 3.

The error detector circuit 5 detects errors in 32 symbol data constituting the input signal in units of one frame (see FIG. 5), and it writes 28 symbols exclusive of P parities into the master RAM 1 and at the same time writes, one by one in units of one frame, error flags as a result of error detection into the error flag RAM 6 addressed by the error flag write address counter 8. Subsequently, in the correction operation for the 28 symbols which are subjected to de-interleave and are read out of the master RAM 1, the error correcting operation circuit 7 makes reference to values of the error flag RAM 6 which are addressed for the respective symbols by values of the error flag read address counter 9 having values of the frame read counter 10 as the initial values.

Figure 5:
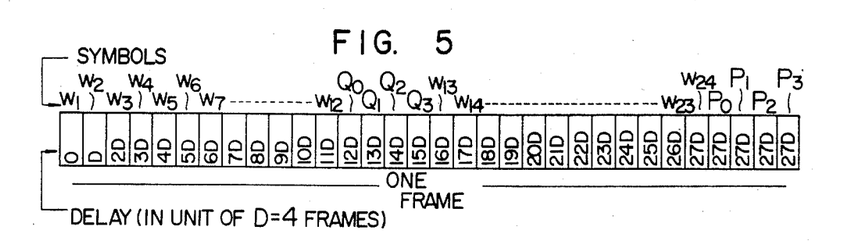
FIG. 5 shows a recording format illustrative of names of symbols and delay thereof within one frame.
Figure 6:
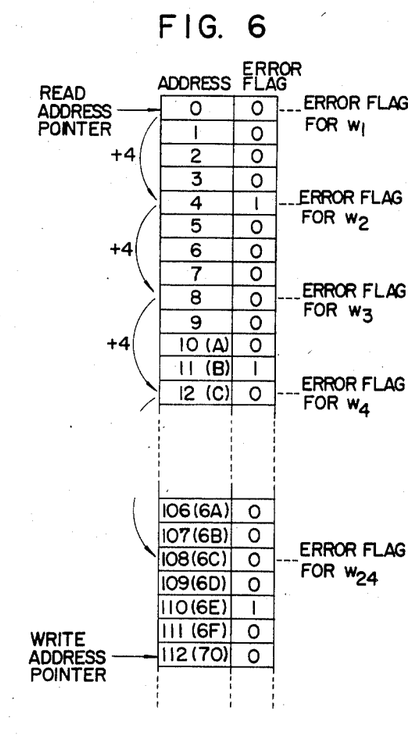
FIG. 6 shows a format illustrative of read and write addresses in an error flag RAM.

As shown in FIG. 5, the heading symbol of the 28 symbols exclusive of P parities is permitted to reproduce after $(28-1) \times 4 = 108$ frames since the interleave distance between adjacent symbols is now assumed to be 4 frames. Accordingly, the error flag RAM 6 is required to have a capacity of $28 \times 4 = 112$ or more bits which is preferably $32 \times 4 = 128$ bits since the error flag RAM 6 is addressed by the error flag write address counter 8. Thus, it is necessary that the counters 8 and 10 be of 7-bit construction and preset upon turn-on of the power source so as to be kept offset from each other for their operation. The counter 9 may be a counter of 5-bit construction which is incremented by one count and may designate read addresses in 7 bits corresponding to a sum of the 5 bits and 2 lowermost bits of the counter 10. FIG. 6 shows one example of the address positions designated by the error flag RAM 6 and the counters 8, 10 and 9.

Figure 3:
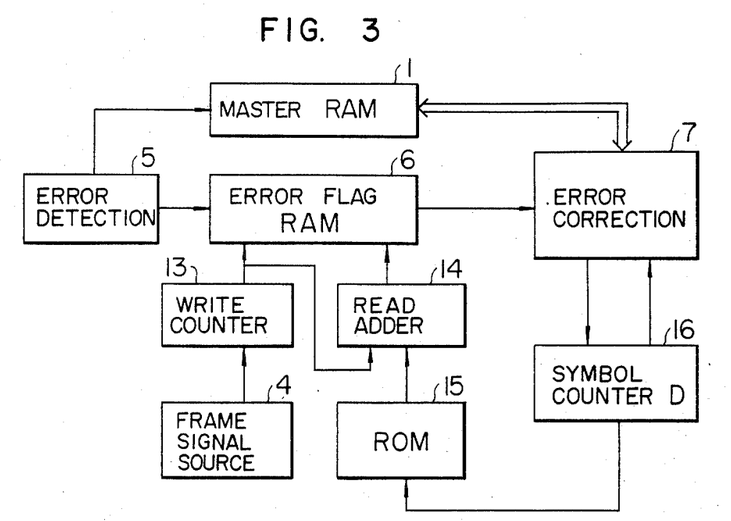
FIG. 3 shows in block form a second embodiment of the error flag processor.

Turning now to FIG. 3, a second embodiment of the invention will be described which carries out the same operation as the first embodiment. In FIG. 3, the signal source and D/A converter are omitted for simplicity of illustration. An error flag processor of this embodiment comprises a write address counter 13, an error flag RAM 6, an error detector circuit 5, an error correcting operation circuit 7, a master RAM 1, a read address adder 14, a ROM 15 and a symbol counter D 16. The preparation of error flags by the error detector circuit 5 and the address designation for the error flag RAM 6 by the write address counter 13 are the same as those in the previous first embodiment. Thus, an error flag read operation will be described below.

As shown in FIG. 6, the distance between a flag write address and an error flag read address for each symbol is always constant in the error flag ROM. Accordingly, in the correction operation for the 28 symbols which are subjected to de-interleave and read out of the master RAM 1, the error correcting operation circuit 7 can make reference to an error flag for any desired symbol by using the ROM 15 which receives input data representative of a position of the desired symbol from the heading symbol and produces output data representative of an address distance corresponding to the position. To this end, the value of the symbol counter D 16 indicative of the symbol position is supplied to the ROM 15, the output of the ROM 15 and a value of the write address counter 13 are read and added by the address adder 14, and a read address in the error flag RAM 6 corresponding to the desired symbol is designated.

If the conventional processor in which each symbol is added with an error flag in the PCM audio disc reproducing system, each symbol of 2K words inclusive of interleave and jitter needs one bit, thus requiring 2K bits in total for error flags.

In contrast, according to the error flag processor of this embodiment, the 2K-bit RAM can be replaced by a simple circuit which includes in combination the error flag RAM of about 120 bits and the three counters or the two counter, ROM and adder which are adapted for address control of the error flag RAM.

Figure 4:
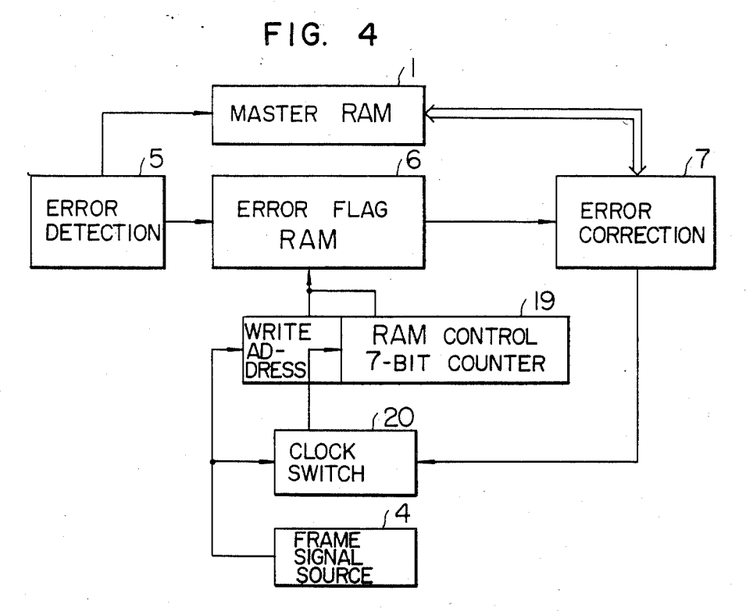
FIG. 4 shows in block form a third embodiment of the error flag processor.
Figure 7:
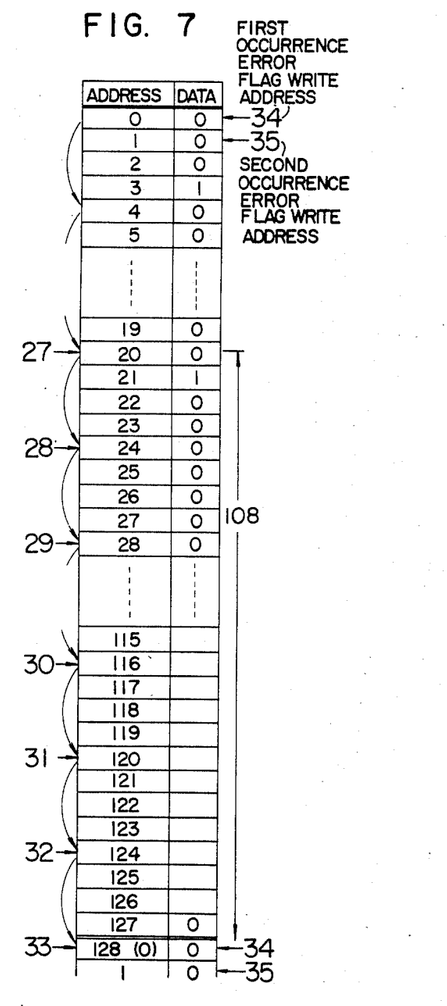
FIG. 7 shows another format of the error flag RAM.
Figure 8:
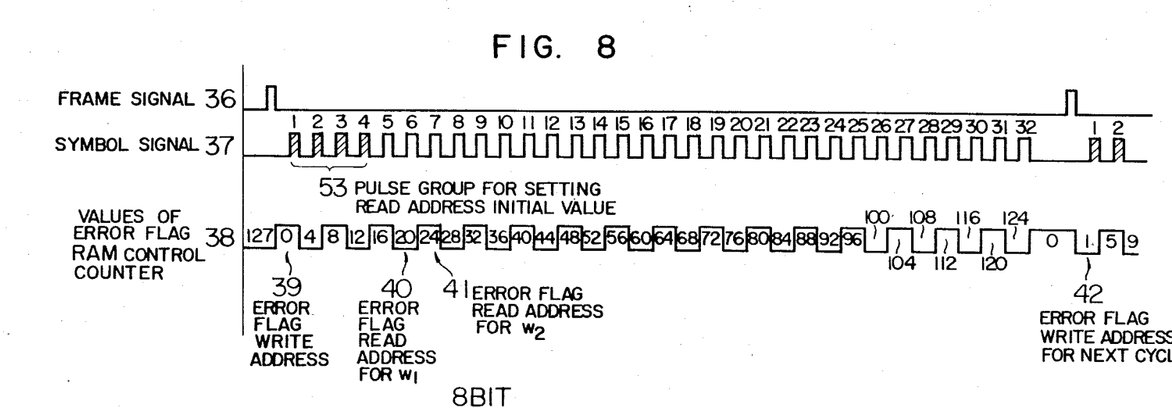
FIG. 8 is a time chart useful in explaining values of a counter for controlling the error flag RAM with respect to a frame signal and a symbol signal.

FIG. 4 shows in block form a third embodiment of the error flag processor suitable for application to the PCM audio disc reproducing system, FIG. 7 shows details of an error flag RAM, and FIG. 8 shows values of an error flag RAM control counter.

The error flag processor of FIG. 4 comprises the error flag RAM as designated by a reference numeral 6, an error detector circuit 5, a master RAM 1, an error flag RAM control counter 19, an error correcting arithmetic operation circuit 7 and a clock switching circuit 20.

In the PCM audio disc, the interleave distance between adjacent data is 4 frames, and one frame has 28 data symbols exclusive of 4 parities (Reed Solomon code) for error detection. Accordingly, on the assumption that the error flag RAM has a capacity of 128 bits, a 7-bit counter is used as the error flag RAM control counter 19.

Errors in an input signal divided by a synchronizing signal are detected by the error detector circuit 5, and 24 symbols of audio data and 4 symbols of partities for error correction (Reed Solomon Code) are written into the master RAM 1 and error flags as a result of the error detection are written into the error flag RAM 6 whose write addresses are designated by the error flag RAM control counter 19.

Subsequently, when the error correcting operation circuit 7 corrects the 28-symbol data which is subjected to a de-interleave operation and read out of the master RAM 1, an error flag for each symbol is read by the error flag control counter 19, a designated address in the error flag RAM 6 is referred to for the correction operation, and corrected data is again written into the master RAM 1. The error flag RAM control counter 19 is adapted to provide read and write addresses for the error flag RAM, and it is incremented by one count each time a frame signal occurs so as to designate the write address and is also incremented in accordance with the uppermost five bits alone of the 7 bit count positions in response to a symbol signal sent from the error correcting arithmetic operation circuit before occurrence of the next frame signal, thereby providing the read address. The clock switching circuit 20 is adapted to switch the clock of the uppermost five bits for the error flag RAM control counter 19 to the frame signal and the symbol signal.

The error flag RAM has the relation between address and data as specifically shown in FIG. 7. In FIG. 7, a reference numeral 27 denotes a read address of an error flag for the heading data symbol ($W_1$), 28 to 33 denote read addresses of error flags for data symbols $W_2$, $W_3$ and $W_{25}$ to $W_{28}$, respectively, and 34 and 35 denote write addresses of error flags of the first and second occurrences. Values of the error flag RAM control counter 19 are shown in FIG. 8 in relation to the frame signal and the symbol signal. In FIG. 8, a reference numeral 36 denotes the frame signal, 37 the symbol signal, 38 values of the error flag RAM control counter, 39 an error flag write address, 40 and 41 error flag read addresses for $W_1$ and $W_2$, respectively, 42 an error flag write address of next occurrence, and 43 a group of pulses for setting a read address initial value.

When the frame signal is received as shown in FIG. 8 and the error flag RAM control counter 19 is counted up and to complete writing of an error flag into the 0-th address of the error flag RAM 6, the counter 19 is requested to be incremented by four counts, starting from an initial value of 20-th address, for providing a read address. Accordingly, as shown in FIG. 8, the 7-bit counter 19 is incremented by the frame signal 36 to provide the error flag write address. Upon completion of writing, only the uppermost five-bit clock of the counter is switched to the symbol signal 37 by means of the switching circuit 20. Then, write addresses of the error flag RAM 6 corresponding to 28 data symbols are designated by a group of pulses following occurrence of four invalid pulses 43 for setting the initial value. After the designation of the 28 addresses, the uppermost five-bit clock is again switched to the symbol signal and the frame signal by the switching circuit 20 and, like the lowermost bits, is put into a waiting condition for reception of the frame signal.

In this manner, according to this embodiment, if the capacity of the error flag RAM is so selected as to be a multiple of the interleave between adjacent data, which interleave takes the second, third, ... power of 2 times frame, the error flag write addresses in the error flag RAM in units of one frame and the read addresses corresponding to the respective symbols upon the correction operation can be obtained by a simple construction comprised of one counter and the clock switching circuit.

Further, when the timings for the frame signal and the symbol signal both serving as inputs to the clock switching circuit are controlled by the error correcting arithmetic operation circuit, the clock switching circuit may be constructed in the form of a simple OR gate.

These elements may be incorporated into an LSI, thereby making it possible to save the storage capacity of the RAM as originally intended by the present invention and the miniaturization of the system as well.

Further, the present invention also contemplates reduction of the capacity of a RAM dedicated to flags which stores the flags for concealment such as linear interpolation of data (corresponding to words) which are not possible to correct error after completion of the ordinary error correction. Embodiments to this end will now be described with reference to FIGS. 9 to 14.

Figure 9:
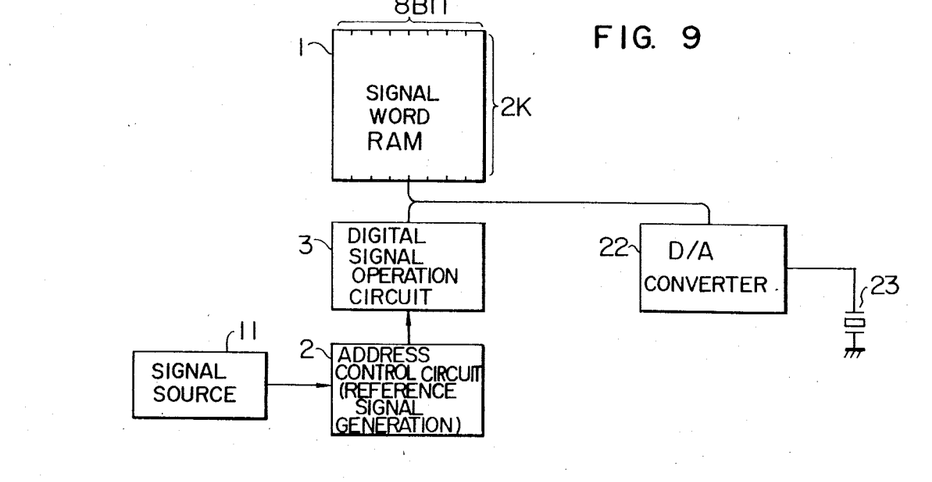
FIG. 9 shows in block form a fourth embodiment of the error flag processor according to the invention.

As can be seen from comparison of FIG. 9 with FIG. 1, it will be appreciated that FIG. 9 lacks the error flag RAM 21 which is illustrated on the right of the signal word RAM 1 in FIG. 1. Thus, the embodiment of FIG. 9 is characterized by elimination of the error flag RAM 21.

Figure 10:
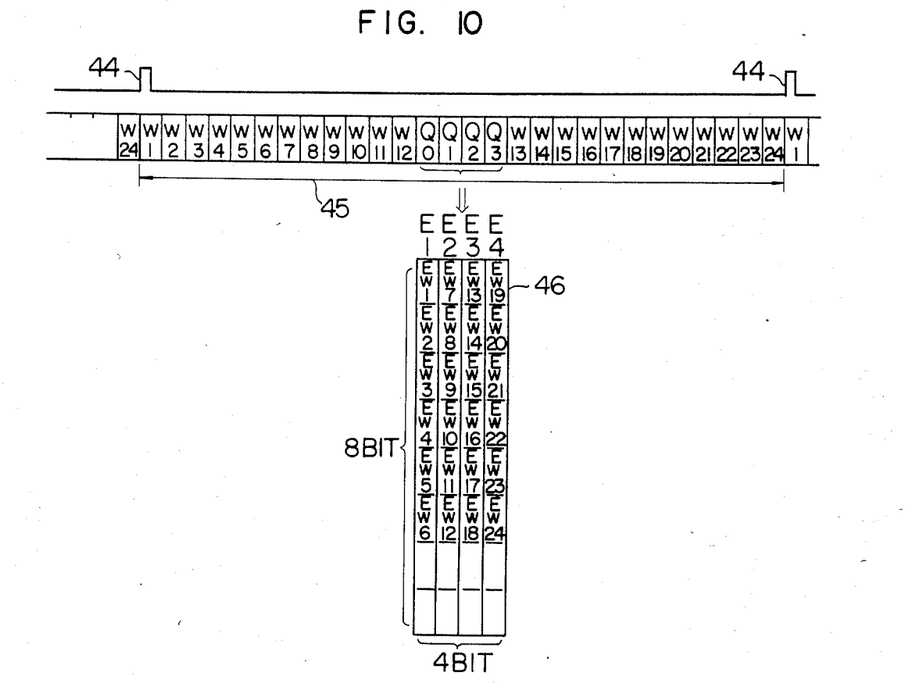
FIG. 10 shows a format illustrative of the relation between arrangements of signal words, correction words and error flags.

In describing the operation of the FIG. 9 embodiment, reference is made to FIG. 10 which illustrates a group of words ($W_1$ to $W_{24}$, $Q_0$ to $Q_3$) confined within one frame defined by sequential synchronizing signals 44, which group contains 24 signal words $W_1$ to $W_{24}$ and four correction words $Q_0$ to $Q_3$. Errors in the signal words in the frame are corrected in accordance with a predetermined formula, but ability to correct the errors is limited and erroneous signal words which have avoided the correction operation must be designated with error flags.

At the completion of the error correction operation, data for the correction words ($Q_1$ to $Q_3$) becomes unnecessary so that memory addresses for the correction words may be designated and used as error flag regions $E_1$ to $E_4$.

Since each of the correction words is of an 8-bit format, 4 words $\times$ 8 bits = 32 bits of regions can be used and 24 of signal information $EW_1$ to $EW_{24}$ can be arranged as shown at 46 in FIG. 10.

It is a simple measure to write error flags judged within one frame as designated at 45 into the RAM 1 at correction words of the same time. But when such writing on the same frame is impossible from the standpoint of time for signal processing (such as time for processing of error word connection), the error flags may be written into correction words of the previous frame which has already become unnecessary. Alternatively, addresses for the error flags may once be stored in a buffer temporarily and may then be stored in correction word regions of a subsequent frame during a time zone for the subsequent frame. In any case, the signal words are different from the error flag addresses but the relative relation therebetween is fixed.

Figure 11:
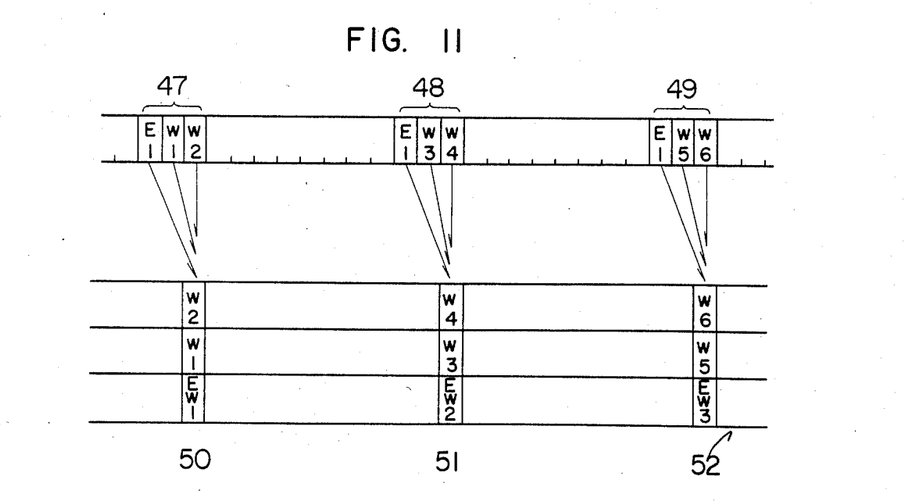
FIG. 11 is a timing chart illustrative of D/A reading from a data bus.
Figure 12:
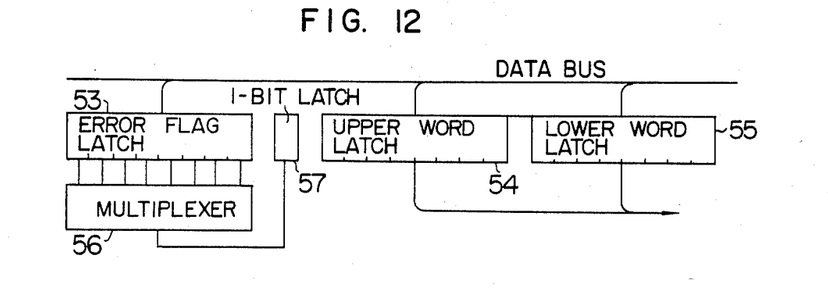
FIG. 12 is a block diagram of an error flag read circuit in a D/A converter circuit.

FIG. 11 is useful to explain the error flag read operation in a D/A conversion circuit and FIG. 12 shows in block form an error flag read circuit.

Specifically, FIG. 11 shows a D/A conversion read timing chart in which timings 47, 48 and 49 on a data bus are time slots allotted to the D/A conversion. At the timing 47, the RAM data output $E_1$ (originally, the region of correction word $Q_0$) is first latched by an error flag latch 53 and thereafter one bit ($EW_1$) is selected by a multiplexer 56 and latched at an error flag bit position 57. Subsequently, the RAM data output $W_1$ from the data bus is latched by an upper signal word latch 54 and then the RAM data output $W_2$ is latched by a lower signal word latch 55. At this time, 16 bits of signal word (upper 8 bits and lower 8 bits) and 1 bit error flag are set up.

Figure 13:
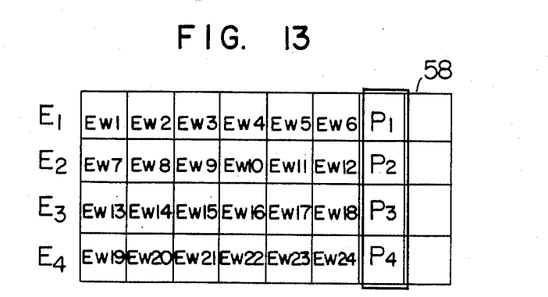
FIG. 13 shows an embodiment of a storage area.

FIG. 13 shows an example wherein correction word areas $E_1$ to $E_4$ are added with peak level flags. Where the signal words are representative of musical signals, the peak level flags are used for indication purposes and they need not be so precise as to indicate which word exceeds a peak level. For example, when only one of six signal words assumes a peak value (as represented by, for example, the upper five bits which are all "1"), a flag indicative of this state is raised. Specifically, for six signal words $W_1$ to $W_6$ shown in FIG. 10, a flag $P_1$ is raised at a peak level flag area 58; for six signal words $W_7$ to $W_{12}$, a flag $P_2$ is raised; for six signal words $W_{13}$ to $W_{18}$, a flag $P_3$ is raised; and for six signal words $W_{19}$ to $W_{24}$, a flag $P_4$ is raised.

Even in the case where two 8-bit signal words (16 bits) are used for one sample audio signal, one peak level flag may be provided for every three samples and as described previously, the flag may be stored in an old correction word area.

Figure 14:
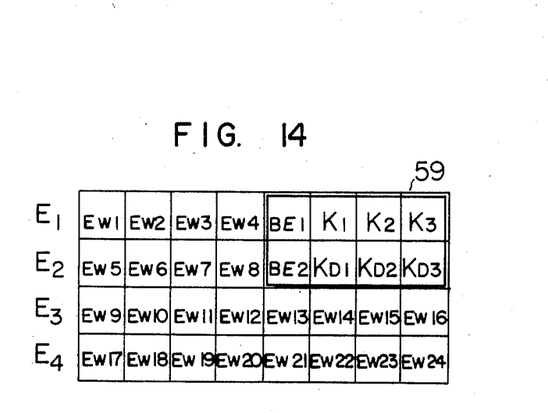
FIG. 14 shows another embodiment of the storage area.

FIG. 14 shows another embodiment of the correction word area. Error word correction sometimes becomes invalid dependent on the number of error signal words and in this case, it cannot be determined which signal word information within one frame is correct or erroneous. Such an error in a unit of one frame is called a frame error, and a flag indicative of the frame error is needed. Shown in a region 59 in FIG. 14 are frame error flags BE1 and BE2. Even if some word groups are delayed and some word groups are not delayed when signal words within one frame are delivered to the D/A conversion circuit, the two flags BE1 and BE2 effectively correspond to the delay word groups and the not delayed word groups or vice versa. For example, while signal word groups $EW_1$ to $EW_4$ and $EW_9$ to $EW_{16}$ are not delayed and associated with the flag $BE_1$, signal word groups $EW_5$ to $EW_8$ and $EW_{17}$ to $EW_{24}$ are delayed and associated with the flag $BE_2$.

The execution in an operation circuit 3 is started and stopped in accordance with a signal from a reference signal generator 2 as shown in FIG. 9. This signal depends on a synchronizing signal in the form of a jitter reproduced from the disc. Accordingly, the operation processing in the operation circuit 3 is sometimes interrupted and it is sometimes not executed. Thus, the degree of the execution of the operation is indicated in the form of flags and stored as shown at $K_1$ to $K_3$ and $KD_1$ to $KD_3$ in an area 59 in FIG. 14. These flags may be stored to indicate that the error correction circuit is not executed when $K_1$ and $KD_1$ are "1", that the error word search for the signal word is completed when $K_2$ and $KD_2$ are "1", and that the operation of the error correction circuit is completed when $K_3$ and $KD_3$ are "1". The two series of K and KD are provided in consideration of the aforementioned delay.

The above flags are all allotted to storage areas which have once been occupied by old correction words.

Where the conventional processor utilizing the error flag added to each signal word is employed in the PCM audio disc reproducing system, one bit for each signal word of 2K words inclusive of interleave and jitter and an error flag RAM of 2K bits in total is needed.

However, according to the invention, a RAM of 2 K bits dedicated to error flags is not necessary. The error flags can be allotted to unoccupied regions in a RAM and the additional provision of the address control, simple decoder circuit and latch of several bits can assure attainment of performances comparable to those of the prior art processor and can reduce the production cost and the area of the circuit board.

What is claimed is:
1. An error flag processor comprising:
(a) a master memory having areas for storage of a plurality of information word frames each comprised of a plurality of signal words and associated parity words determined from the signal words of a predetermined number of frames;
(b) error word detecting means for detecting error words within each information word frame on the basis of the associated parity words;
(c) an error flag storage means having the capacity for storing an error flag for each of said predetermined number of frames;
(d) error flag write means for successively writing error flags produced as a result of detection of errors in the input data in frames by the error word detecting means into the error flag storage means for each frame;
(e) error correcting means connected to said master memory and said error flag storage means for correcting error words within each word frame comprised of the signal words rearranged in an original time series sequence as identified by error flags from said error flag storage means; and

(f) error flag read means for reading from said error flag storage means error flags so as to be allotted to individual words of each rearranged signal word frame in association with signal words from said master memory into said error correcting means, whereby when data subject to de-interleave and read-out from said master memory is then subjected to a correcting operation by said error correcting means, error flag information allotted to individual words is read out of the error flag storage means by said error flag read means and the error words are corrected by said error correcting means in correspondence to receipt of an error flag.

2. An error flag processor according to claim 1, wherein said error flag storage means comprises a random access memory and said write means and said read means comprise means for generating addresses for writing data into and reading data from said random access memory, respectively.

3. An error flag processor according to claim 2, including means for generating frame signals, and wherein said error flag write means comprises a first counter connected to receive said frame signals for generating error flag write addresses, and said read means comprises a second counter connected to receive said frame signals and operating at a predetermined offset with respect to said first counter to provide an initial value of the error flag read address and a third counter connected to said second counter for generating error flag read addresses taking the value of the second counter as an initial value and counting in accordance with an interleave distance between adjacent words for reading out of said random access memory the error flags allotted to the individual words when the error correcting operation is effected.

4. An error flag processor according to claim 2, including means for generating frame signals, and wherein said error flag write means comprises a first counter connected to receive said frame signals for generating error flag write addresses, and said read means comprises a second counter connected to said error correcting means for counting the order of the words in a frame when the error correcting operation is effected, a read-only-memory (ROM) connected to said second counter for providing a distance of the read address from the write address in accordance with the value of said second counter, and an adder connected to receive as inputs the output of the ROM and the value of said first counter for generating error flag read addresses to read out of said error flag storage means the error flags allotted to the individual words when the error correcting operation is effected.

5. An error flag processor according to claim 1, wherein correcting operation results are stored in units of a bit in correction word storage areas of selected information frames in said master memory.

6. An error flag processor according to claim 5, wherein said correcting operation results are representative of flags allotted to erroneous signal words which have failed to be corrected.

7. An error flag processor according to claim 5, wherein said correcting operation results are representative of flags indicating whether the digital signal operation is executed or not.

8. An error flag processor according to claim 5, wherein said correcting operation results are representative of flags indicating values of comparison between a predetermined level and signal word levels.

9. An error flag processor comprising:
(a) a memory having areas for storage of a plurality of information word frames each comprised of a plurality of signal words and associated correction words determined from the signal words of the frame;
(b) error word detection means for detecting error words within each information word frame;
(c) error correcting means coupled with the error detecting means and said memory for correcting errors in each signal word frame comprised of the signal words rearranged in an original time series sequence by being subjected to de-interleave and read-out of said memory; and
(d) address control means for reading and writing error word correction results which are derived from said error correcting means from and into storage areas of the correction words in a selected signal information frame subject to said error correction within said memory in units of a bit for each signal word in said rearranged signal word frame.

10. An error flag processor according to claim 9, further comprising a D/A converter coupled with said memory to read error flags added to the signal words from said address control means under the control thereof and to judge whether interpolation correction for error words is required or not.

11. A digital signal processor for processing a digital signal received from a signal source, said digital signal consisting of a plurality of frames of interleaved words, each frame including information words and error detection words determined from the information words, said information words consisting of a plurality of signal words and error correction words, and each signal word and error correction word being interleaved by a predetermined number of frames from an original time series sequence; said processor comprising:
(a) error word detecting means for detecting every information word frame as to whether error words are contained in said plurality of signal words in said information word frame and for producing an error flag representing the result of the error word detection;
(b) a master memory including means for storing the plurality of interleaved information words of each received frame and means for deinterleaving interleaved signal words of each stored frame into said original time series sequence by selective read-out of the stored signal words;
(c) an error flag memory for storing said error flags produced by said error word detecting means, said error flag memory including means for storing an error flag indicating the presence of error words detected by said error word detecting means for each information word frame;
(d) error correcting means responsive to said signal words rearranged in the original time series sequence and said error flags from said error flag memory for correcting signal words detected as error words;
(e) error flag write means for writing said error flag from said error word detecting means into said error flag memory for each information word frame in sequence; and
(f) error flag read means responsive to signal words read out from said master memory for reading error flags for said signal words from said error flag memory into said error word correcting means with intervals corresponding to said predetermined number of frames by a number of times corresponding to the number of information words for one information word frame and for shifting the start position of said reading from said error flag memory for a subsequent information word frame by one error flag position.

12. The processor according to claim 11, wherein said error flag memory is a random access memory, said error flag write control means includes an error flag write address counter for generating sequential addresses at which said error flags are stored in said random acces memory, and said error flag read means includes a frame read counter for outputting a frame read signal when said predetermined number of information word frames are counted, and an error flag read address counter responsive to the output of said frame read counter and signal words inputted from said master memory through said error correcting means, for reading out error flags for said inputted signal words from said random access memory into said error correcting means.

13. The processor according to claim 12 wherein said error flag read means comprises a read only memory control counter for counting the number of signal words when the error correction is effected in the error correcting means, a read only memory for providing a different information word frame number corresponding to the value of said read only memory control counter, and an adder connected to reserve as inputs an output of said read only memory and a value of said error flag write address counter.

14. The processor according to claim 11 wherein said error correcting means further generates an error flag for concealement when correction for a signal word from the master memory is not possible on the basis of the error flag from the error flag memory and said signal word from the master memory, and master memory control means is provided for writing the error flag for concealment into a storage area of correction words of the information word subjected to the error correction.

* * * * *